United States Patent [19]

Lane et al.

[11] 3,812,456

[45] May 21, 1974

[54] A HYDRO-ACOUSTIC FILTER

[75] Inventors: Richard N. Lane; Claude W. Horton, both of Austin, Tex.

[73] Assignee: The United States of America as represented by the Secretary of the Navy, Washington, D.C.

[22] Filed: Apr. 20, 1956

[21] Appl. No.: 579,700

[52] U.S. Cl. ................ 343/8 R, 181/.5 F, 340/13 E

[51] Int. Cl. ........................................ H04r 23/00

[58] Field of Search ............. 340/5, 8, 13, 14, 8 LF; 181/35, 36, .5

[56] References Cited

UNITED STATES PATENTS 2,405,179 8/1946 Black et al. ............................ 340/8

*Primary Examiner*—Maynard R. Wilbur
*Assistant Examiner*—Richard E. Berger

[57] ABSTRACT

This invention relates to a hydroacoustic filter of a character adapted to be used as a passive frequency selective network for feeding an acoustic pressure sensitive detector or the like. The filter along with the accompanying detector are each well adapted for use in combination, as a part of an acoustic wave detecting mechanism for naval mines.

5 Claims, 5 Drawing Figures

INVENTORS
R. N. LANE
C. W. HORTON

BY

G. D. O'Brien
W. O. Quesenberry
ATTORNEYS

INVENTORS
R. N. LANE
C. W. HORTON

BY

ATTORNEYS

A HYDRO-ACOUSTIC FILTER

More specifically, the frequency selective network is composed of acoustic inductances, resistances, and capacitance elements comprising tubes, orifices, bellows or diaphragms.

Prior frequency selective filters for accomplishing the purpose of the instant invention have necessarily incorporated acoustic pressure sensitive piezoelectric crystal detecting devices feeding through electrical network circuits to vacuum tube amplifiers. These prior systems when used for low frequency detection purposes impose certain disadvantages which are well known to those skilled in the art viz., that it is extremely difficult to manufacture electrical components suitable for wave filters at very low frequencies in the range of 3 to 7 cps. The design, manufacture and assembly of electrical circuit components for a filter providing band-pass characteristics for this frequency range would entail components generally considered to be too large for use in present mine cases. Also the battery power source demands required by vacuum tube circuitry materially shortens the active life of a mine. Moreover, piezoelectric transducers are not generally as rugged as the passive type filter and detector system hereinafter to be described. In naval mines the ruggedness of the overall mechanism is a prime consideration due to the manner of launching as for example from aircraft.

The filter circuit of this invention may be compared by analogy to electrical circuits for purposes of design of the parameters thereof as well as for purposes of better understanding the functioning thereof. This passive filter provides certain advantages not readily obtainable with other types of filter networks when used in combination with low frequency electrolytic detector devices. This type of filter when used in combination with an electrolytic detector provides greater attenuation outside the pass band than is deemed possible with either piezoelectric crystal or electro magnetic detectors and vacuum tube circuits. Moreover the filter combination will operate at much lower frequencies than has heretofore been possible with piezoelectric detection devices as used with vacuum tube amplification circuit arrangements. This passive acoustic filter and electrolytic detector combination requires a negilible amount of power, thereby insuring a long effective life thereof on a battery type power supply and further insures that the acoustic filter and electrolytic detector when mechanically combined in the instant arrangement insure a much more rugged type of construction and a greater simplicity of manufacture.

It is a feature of this invention to provide a practical method of designing a hydroacoustic filter to be used as a passive frequency selective network for feeding a predetermined narrow band of signals to an acoustic pressure sensitive detector. This designing as will hereinafter become apparent may be accomplished by making analogies to electrical filter circuit theory.

One object of the instant invention is to provide a new and novel combination of capacitive, inductive and resistive impedance elements in a predetermined arrangement and utilizing hydraulic-acoustic circuits equivalent to electrical circuit components for a low frequency filter network for use in conjunction with an electrolytic pressure sensitive detector.

Another object of this invention resides in providing a new and novel hydroacoustic filter of rugged design for driving an electrolytic detector having very low current demand requirements.

Another object of this invention is to provide a passive hydroacoustic filter of a character incorporating components of reduced size as compared to the size of components required to provide an electrical equivalent filtering function for driving a similar or equivalent detecting device.

Another object of the instant invention is to provide a passive filter of selective characteristics which is of rugged construction and is well adapted for mounting in the mine casing of a ground mine.

A further object of this invention resides in providing a hydroacoustic frequency selective filter of a character which is substantially immune to shock, while insuring performance equivalent to or improved over filter systems heretofore or now in general use in mine circuitry, and which obviates the requirement for piezoelectric detectors and vacuum tube amplification circuitry therein.

Other objects and many of the attendant advantages of this invention will be readily appreciated as the same becomes better understood by reference to the following detailed description when considered in connection with the accompanying drawings wherein.

Figure 1:
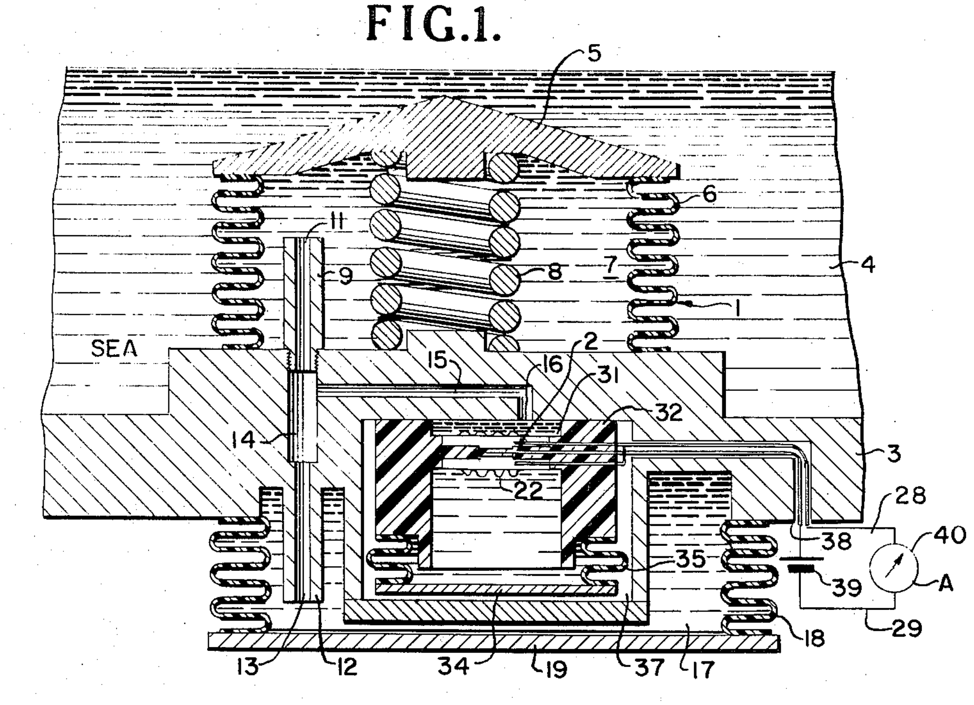
FIG. 1 is a diagrammatic illustration in axial section of a passive filter network assembly of the instant invention.
Figure 3:
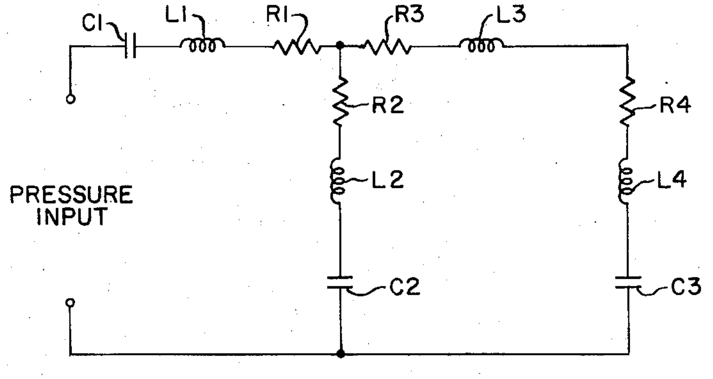
FIG. 3 is a circuit diagram in which mechanical elements of the passive filter are represented by analogous symbols for the electrical component equivalents of the instant filter.
Figure 4:
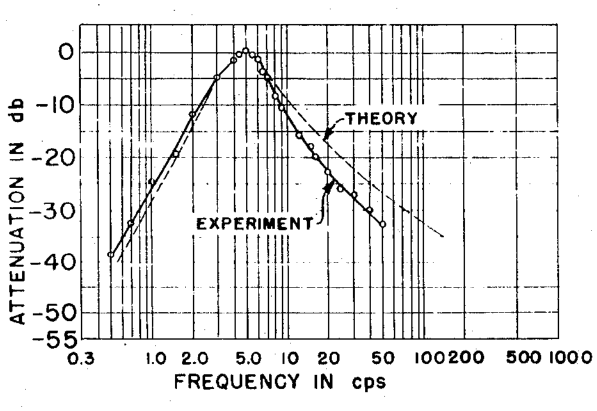
Figure 5:
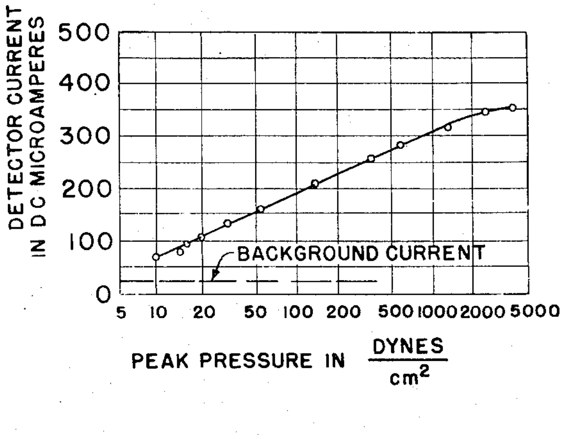

FIG. 4 is a curve showing the frequency response characteristics of the filter of FIGS. 1 and 3 as compared to the theoretical frequency response characteristics for the equivalent electrical analogue circuit of FIG. 3 the frequency response of the passive filter being for a condition when subjected to sinusoidal input pressure signals; and FIG. 5 is the curve showing the response of a passive filter to sinusoidal input pressure signals of 4½ cycles per second frequency and further showing the logrithmic characteristic of the dc output currents thereof.

Referring now to FIG. 1 of the drawings there is shown a packaged low frequency band-pass hydroacoustic filter unit of a preferred embodiment of the instant invention and for use in the detection of underwater acoustic signals in the 3 to 7 cycle per second band. This filter network as shown in FIG. 3 provides strong rejection of acoustic signals of frequencies outside the pass-band thereof and is well adapted for operation at water depths from 0 to 180 feet. The filter unit is indicated generally at 1 and the associated detecting device is indicated at 2. This system operates properly for input pressure signals in the band from 10 to 1,000 dynes/cm$^2$ with appropriate attentuation of signals outside the band at much higher pressures. Moreover the detecting element in the filter is of such character that the output of the detector provides a desired logarithmic function of the input pressure. Other functional relationships are possible by modification of the associated detection device.

The combination filter and detector is shown mounted in a portion of a mine casing 3 with the exterior of the unit submerged in sea water indicated at 4. The input or driving surface to which the signal is applied is indicated by a disc shaped mass 5 which is connected with a "Sylphon" type bellows or other expansible element 6 which in turn is connected and sealed to the casing portion 3 to enclose a fluid filled volume indicated at 7. A certain resistance to ambient pressure of the sea water is provided by the compression spring 8 which is disposed between the mass element 5 and the body 3 to normally maintain a predetermined distending of the bellows 6. The structure providing the fluid volume 7 together with the resilience of spring 8 corresponds to the input capacitance indicated at $C_1$ in FIG. 3.

The casing portion 3 which if desired may be a separate unit adapted for attachment to the mine casing is provided with an upwardly extending tubular portion 9 having a drilled tube 11 extending therethrough and through a similar projection 12 in the lower portion of the housing 3. Disposed intermediate of the drilled tube portions 11 and 13 is a second tubular passage 14 of somewhat larger diameter and interconnecting the passages 11 and 13. The body portion 3 is also provided with the additional tubular passages 15 which extends laterally from passage 14 and terminates in a manner to provide a bent tube passage 16 which communicates with the detecting device 2. The passage 11 corresponds to the electrical inductance and resistance indicated at L1 and R1 of FIG. 3 while the tube portion 13 corresponds to the resistance and inductance elements indicated at L2 and R2.

The tubes 15 and 16 taken together correspond to the combined inductance and resistance, respectively of L3 and R3 of the analog circuit.

The drilled passage 13 in the tube 12 is in fluid communication with a volume 17 which together with the shunting sylphon bellows 18 and the mass 19, which encloses the volume 17 between the casing 3 and the mass 19 comprises a capacitance corresponding to capacitance $C_2$ of FIG. 3. The detector assembly 2 which comprises a plastic body 20 closing an electrolyte solution as by a pair of diaphragms 21 and 22 is provided with a partition 23 integral with the body 20 to support the cathode assembly 24. It effectively divides the interior thereof into a pair of chambers for detection of acoustic signals with flow of ions through the ion starved cathode zone with a suitable oxidation reduction solution such as iodine therein. This provides an electrical current flow in the output circuit. Disposed in the central portion of the partition is a cathode assembly 24 having an orifice 30 through the noble metal cathode electrode at 25 and providing flow communication between the chambers of the anode electrode 26 and the anode electrode 27. The electrodes 26 and 27 are connected by external lead 28 to an external circuit and the cathode electrode 25 is connected as by lead 29 to the same external circuit as for example that of the meter A at 40 of FIG. 1. This detector is disposed in a well assembly 31 provided in the plastic housing 32. The diaphragm 22 is disposed in a reference volume chamber 33 as provided by the closing plate 34, and the "Sylphon" bellows 35.

Referring again to FIG. 3 the resistance and inductance of the detector, which has provided therein an orifice 30 in cathode electrode 25 for fluid movement between the two chambers thereof, is represented by the resistance element R4 and the inductance L4. The reference volume of chamber 33 corresponds to the capacitance $C_3$.

Figure 2:
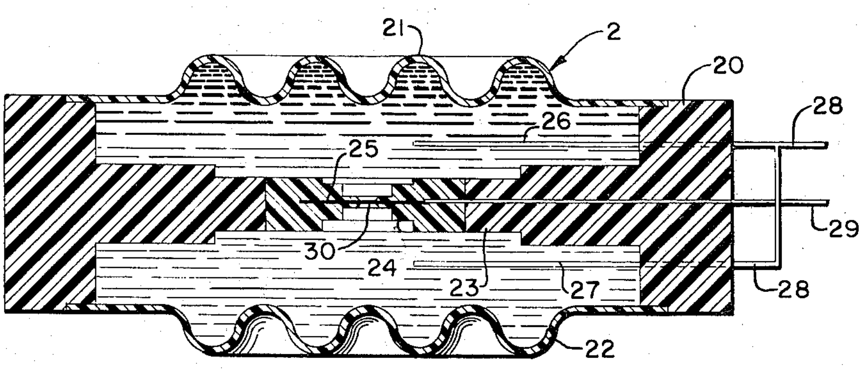
FIG. 2 is an enlarged diagrammatic view in vertical section of the electrolytic detecting unit assembly of FIG. 1 showing construction thereof in greater detail.

The fluid filling the major portion of the interior of the filter assembly maybe of the character of Dow-Corning silicone fluid of three centistokes kinematic viscosity, and the electrolyte fluid in the detector of FIG. 2 may advantageously be a water based oxidation reduction Iodide electrolyte and of a character in which Iodine molecules are collected out in the cathode-anode circuit thereof to provide a direct current flow irrespective of the direction of electrolytic flow and by means which an indication of the flow of fluid in the output circuit of the filter and may be measured as by for example by the microampmeter shown at 40 in FIG. 1. Alternatively, this output may be applied as a detected signal to other mechanisms to the mine utilization circuits as desired.

When the mine carrying the device is planted, the mass 5 which is mounted on the spring backed filter input bellows 6 is arranged to face or be exposed to the sea water for movement in response to pressure signals and is the initial receptor of the acoustic signal. Where the filter is immersed to the maximum depth for which it was designed, this input bellows displaces a predetermined quantity of fluid into the rest of the system. The fluid first goes through the input inductance-resistance tube 9 then through the shunt inductance-resistance tube 12 and output inductance-resistance tube 15 to the detector 2. The detector passes the filtered signal into the large shunt bellows 18 and small output bellows 35.

The detector electrolyte is separated from the other fluid in the system by two very thin flexible diaphragms of negligable inductance and very high capacitance. These diaphragms may advantageously be of a chemically inert plastic material such as that shown in the trade as Kel-F. The inductance of which is negligable.

A physical embodiment of the filter and detector combination as shown in FIG. 1 of the drawing occupies a space approximately 6 inches in diameter and 8 inches in height, and contains 300 cc of fluid. When this filter is immersed in water to a maximum depth, it displaces approximately 50 cc of fluid from chamber 7 into the rest of the system. Since the detector diaphragms are only capable of transmitting a displacement up to approximately 4 cc of fluid pressure to the output bellows chamber 35, the input bellows 6 must occupy a volume considerably larger than 50 cc to displace 50 cc of fluid. It is thus spring backed in order to maintain sufficient stiffness. Approximately 99 percent of the fluid displacement in the input bellows is taken up by the shunt bellows 18 and 1 percent by the output bellows 35. The shunt bellows must therefore by a large compliant bellows, while the output bellows may be made quite small compared to the others. Both of the bellows 18 and 35 work into an air load; the bellows 18 working directly into an air load and the bellows 35 through a vented air space 37 which is in flow communication through passage 38 with the interior of the mine.

Acoustically, the impedance of tubes 9 and 12 are identical and the resistance value thereof is approximately 3,300 cgs units while the inductance is 102 cgs units. The sum of the impedance of tube 15 and detector assembly 2 is equal to the same value. The detector resistance is 2,500 cgs units and its inductance is 30.5 cgs units.

The operation of the electrolytic detector FIG. 2, used in this filter is such that the orifice type cathode assembly 24 carrying the cathode electrode 25 as disposed in a partition 23 between the pair of fluid filled chambers of electrodes 26 and 27 and through which cathode an electrolyte solution flows in an amount equal to the fluid displacement in the detector arm of the filter as applied to the detector input diaphragm 21. When the detector is suitably preconditioned before use as a detector by providing a bias thereon for a suitable period of time as by a battery 39 connected between the orifice cathode 25 and the anodes 26 and 27 to establish a starved ion condition in a zone about the cathode orifice 30, an electric current correlative to the fluid displacement through the cathode will flow in the biasing circuit. This electric current has a particularly interesting property as shown in FIG. 5, in that it is a d.c. current which may advantageously be a logarithmic function of the sinusoidal flow of the electrolytic fluid through the orifice cathode. The detector also possesses flat frequency response characteristic over the range of interest for this particular filter. The electrolytic detecting device therefore together with the electroacoustic properties provide an advantageous combination of structure for a detecting system for a mine system.

Referring now to FIG. 4 there is a showing of the frequency response curve for the passive filter and detector unit. The data from which this curve is plotted is taken by measuring the pressure required to give a fixed detector current output as a function of frequency. This in turn has been converted to an attenuation in db below the frequency of peak response. Shown in this plot are both the experimental curve with data points and the broken line curve predicted from the theory for the operation of the acoustic elements of the analog filter. The showing of FIG. 5 gives an illustration of the logarithmic character of the current output of the detector of the passive filter combination. This plot is made for a 4.5 cps. sinusoidal input to the detector, to provide a curve of current in microamperes versus the logrithm of the a-c pressure at the filter input. The background current is the detector current for zero input pressure signal. This curve illustrates the fact that for a-c pressures between 10 and 1,000 dynes/cm$^2$ the response to the package filter and the detector is a logarithmic function of the input pressure.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A hydro-acoustic filter and detecting mechanism of the character disclosed for providing bandpass characteristics in the 3 to 7 cycle per second frequency spectrum and a high order of signal attenuation outside the pass band thereof comprising a housing, a closed circuit T-filter of symmetrical configuration, disposed within said housing and comprising a plurality of hydroacoustic capacitance means, hydraulic resistance and inductance means, one each of said capacitance, inductive and resistance means being disposed in each of three legs of said filter, and means including a grounded input side of said filter providing a closed output circuit therefor.

2. In combination, an acoustic pressure sensitive detector and a passive hydroacoustic filter, said filter comprising a plurality of acoustic inductances, resistances and capacitances as RLC filter elements as formed by tubes, orifices and bellows respectively and in which said filter elements are configured in a network circuit relationship to provide a symmetrical closed circuit "T" filter having series connected capacitance, inductance and resistance elements in each leg of said "T" filter.

3. In an acoustic wave detecting mechanism for providing band pass filtering and detection of low frequency hydroacoustic signals, the combination with an electrolytic detecting cell, of a symmetrical multi-leg, closed circuit hydraulic filter network comprising a hydro-acoustic capacitance means, a hydro-acoustic inductance means, and a hydro-acoustic resistance means connected in series in each leg of said network, said legs being interconnected to provide a hydraulic "T" type network.

4. A hydroacoustic filter and detecting mechanism for use with an acoustic pressure sensitive detector, means in said detector of a character providing an electrical output in response to the application thereto of low frequency hydro-acoustic signals, said filter comprising a grounded input leg and a pair of symmetrical series legs comprising a series connected hydraulic capacitance element, a hydraulic inductance element and a hydraulic resistance element, and a shunt leg comprising filter elements possessing the characteristics of the elements in said series legs and connected hydraulically between said grounded input leg and a junction between said series leg elements.

5. A hydro-acoustic detecting mechanism for transducing a pass band of hydro-acoustic signals in the 3 to 7 cps frequency band into electrical signal intelligence which comprises a filter circuit, a housing, an electrolytic pressure sensitive detector disposed in said housing, an input bellows means connected to provide signal coupling between a source of hydro-acoustic signal intelligence external thereto and the interior of said housing, a plurality of hydraulic short tubes disposed in said housing and providing hydraulic - resistance - inductance filtering characteristics to the hydro-acoustic signals coupled to said filter circuit, a plurality of additional compliant bellows means connected as additional acoustic capacitances in said filter circuit, said filter as comprised of said plurality of short tubes and acoustic capacitances being connected to provide asymmetrical "T" filter network.

* * * * *